(12) United States Patent
Wong et al.

(10) Patent No.: US 7,774,299 B2
(45) Date of Patent: Aug. 10, 2010

(54) FLOW COMPUTING

(75) Inventors: Curtis G. Wong, Medina, WA (US);
James T. Kajiya, Duvall, WA (US);
Steven M. Drucker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 677 days.

(21) Appl. No.: 11/124,856

(22) Filed: May 9, 2005

(65) Prior Publication Data
US 2006/0253685 A1    Nov. 9, 2006

(51) Int. Cl.
G06F 7/00 (2006.01)
(52) U.S. Cl. ...................................... 707/602
(58) Field of Classification Search ....................... 707/2
See application file for complete search history.

(56) References Cited

U.S. PATENT DOCUMENTS

| | | | | |
|---|---|---|---|---|
| 4,042,912 A * | 8/1977 | Bachman et al. | ................ | 707/1 |
| 4,123,795 A * | 10/1978 | Dean et al. | .................. | 718/103 |
| 4,847,755 A * | 7/1989 | Morrison et al. | ............ | 712/203 |
| 5,274,833 A * | 12/1993 | Shima et al. | .................. | 712/25 |
| 5,287,537 A * | 2/1994 | Newmark et al. | ............. | 712/29 |
| 5,574,933 A * | 11/1996 | Horst | ........................... | 712/28 |
| 5,657,465 A * | 8/1997 | Davidson et al. | ............ | 712/201 |
| 5,862,395 A * | 1/1999 | Bier | ............................... | 712/1 |
| 6,145,073 A * | 11/2000 | Cismas | ........................ | 712/25 |
| 6,338,066 B1 * | 1/2002 | Martin et al. | .................. | 707/10 |
| 6,477,665 B1 * | 11/2002 | Bowman-Amuah | .......... | 714/39 |
| 6,615,199 B1 * | 9/2003 | Bowman-Amuah | .......... | 706/50 |
| 6,976,150 B1 * | 12/2005 | Uht et al. | ....................... | 712/18 |
| 7,028,309 B2 * | 4/2006 | Ward et al. | .................. | 719/328 |
| 7,146,353 B2 * | 12/2006 | Garg et al. | ..................... | 707/2 |
| 7,308,687 B2 * | 12/2007 | Trossman et al. | ........... | 718/104 |
| 2002/0174010 A1 * | 11/2002 | Rice, III | ...................... | 705/14 |
| 2002/0199081 A1 * | 12/2002 | Satou | .......................... | 712/34 |
| 2003/0149685 A1 * | 8/2003 | Trossman et al. | .............. | 707/2 |
| 2004/0098569 A1 * | 5/2004 | Smith et al. | .................. | 712/229 |
| 2005/0021530 A1 * | 1/2005 | Garg et al. | .................. | 707/100 |
| 2005/0102674 A1 * | 5/2005 | Tameshige et al. | .......... | 718/100 |
| 2005/0149932 A1 * | 7/2005 | Hasink et al. | ................ | 718/100 |
| 2006/0029089 A1 * | 2/2006 | Zellner et al. | ................ | 370/412 |
| 2006/0029097 A1 * | 2/2006 | McGee et al. | ................ | 370/468 |

OTHER PUBLICATIONS

Stefan Munch and Rudiger Dillmann; Haptic Output in Multimodal User Interfaces; ACM 1997; pp. 105-112.*

* cited by examiner

*Primary Examiner*—John R. Cottingham
*Assistant Examiner*—Mohammed R Uddin

(57) ABSTRACT

Systems and methods directed at providing flow computing. An application configured with flow computing capabilities can determine possible results that are intended by a user based on one or more user-initiated actions. The application identifies idling computing resources in the computing device that are available and automatically performs other actions to produce the possible results using the idling computing resources. The application caches the results and provides at least one of the cached results in an interactive data stream. The user directs the data stream by selecting pre-generated choices to achieve the desired outcome.

11 Claims, 8 Drawing Sheets

FLOW COMPUTING

BACKGROUND

In the last few decades, computers have become one of the most significant means for people to communicate and process information. As computing technologies continue to rapidly advance, the functionalities offered by computers have also been progressing at an ever-increasing pace. However, the fundamental way in which users interact with computers had not experienced a proportional advancement. In particular, interactions between users and conventional computers are still based on a "pull" model.

The "pull" computing interaction model originated from the early days of computing for dealing with the limitations of computing power, storage, memory and bandwidth. When computing time was expensive and people time was cheap, it was advantageous to optimize the usage of computing resources by batch-staging jobs to efficiently fill a computing pipeline.

Recent improvements in computing technologies have dramatically reduced the cost of computing resources. For example, the processing power of today's typical home computers can often rival that of the professional mainframe computers built just a few decades ago. In spite of the advances in computing power, personal computers still rely on the "pull" model for interacting with users. As a result, a typically computer may only use a very small amount of the available computing resources while the computer is waiting for the user to interact (e.g. read, type, command, or control).

An effective solution for better utilizing computing resources of today's powerful computers continues to elude those skilled in the art.

DESCRIPTION OF THE DRAWINGS

The present description will be better understood from the following detailed description read in light of the accompanying drawings, wherein:

FIG. 1 shows an example system for flow computing.

Like reference numerals are used to designate like parts in the accompanying drawings.

DETAILED DESCRIPTION

The systems and methods described herein are directed at flow computing. An application configured with flow computing capabilities can determine possible results that are intended by a user based on one or more user-initiated actions. The application identifies idling computing resources in the computing device that are available and automatically performs other actions to produce the possible results using the idling computing resources. The application caches the results and provides at least one of the cached results in an interactive data stream. The user directs the data stream to achieve the desired outcome.

Thus, a flow computing system may take advantage of idle background computing cycles to anticipate, retrieve, cache, and present possible results that user may desire, thereby relieving the user from having to serially request and refine commands to obtain a desired outcome. The flow computing system also seeks to abstract the user away from specific commands and towards directing outcome and results. The interaction may be focused on orchestrating choices "more like this" and "less like this", without having to rely on arcane command structures that may be unique to each application. One of the advantages of flow computing is to change the interaction paradigm away from the "pull" model and to enable users to learn how computers can work towards leveraging and optimizing computing power to learn how people work as well as anticipating and delivering what the users want in a seamless and effortless manner.

Figure 1:
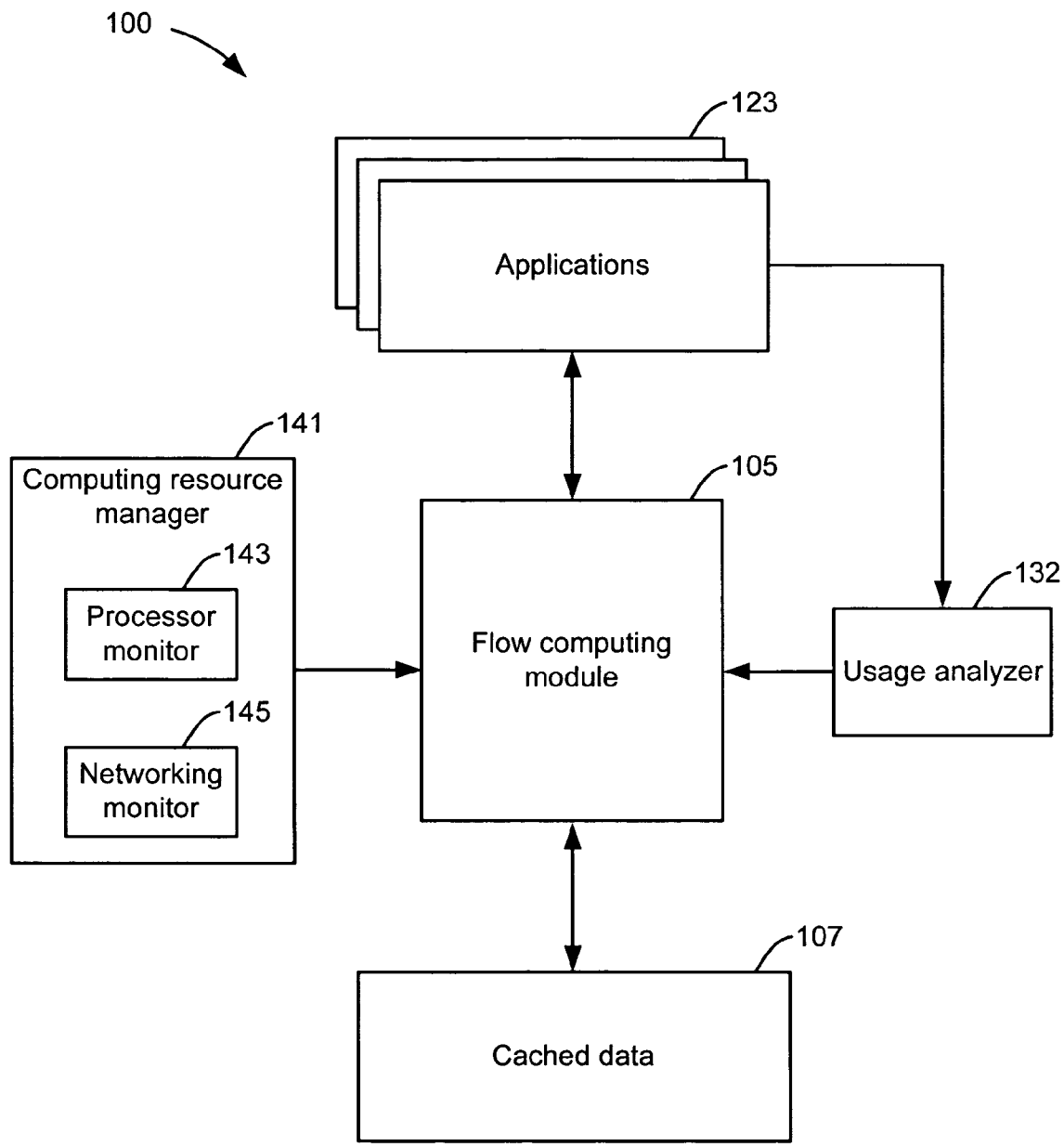
FIG. 1.

FIG. 1 shows an example system 100 for flow computing. Flow computing is a new technique for a user to interact with applications in a computing device. As shown in FIG. 1, flow computing may be implemented in flow computing module 105 that interacts with applications 123. Flow computing module 105 may also interact with computing resource manager 141 and usage analyzer 132.

Applications 123 may include any type of applications that are configured to interact with users. For example, applications 123 may include information processing applications, such as word processors, presentation tools, spreadsheets, databases, media viewing and editing tools, web authoring tools, or the like. Applications 123 may also include media content software, such as viewing and editing tools for video, graphics, audio and images, web browsers, media player, or the like. Applications 123 may be configured to interact with flow computing module 105 to implement flow computing. For example, applications 123 may receive instructions to execute tasks, to retrieve information, and to generate data for flow computing module 105.

Usage analyzer 132 is configured to analyze how applications 123 are used by a user. Usage analyzer 132 may perform analysis on any type of information associated with application usage. For example, usage analyzer 132 may be configured to analyze usage pattern for an application and determine the preferences of the user. Usage analyzer 132 may identify these preferences by evaluating options that have been selected by the user and the context of the usage. Usage analyzer 132 may also be configured to analyze usage pattern based on structures and usage frequencies of the commands of the application. Usage analyzer 132 is configured to provide usage related data from the analysis to flow computing module 105.

Computing resource manager 141 is configured to manage the resources of the computing device on which applications 123 are executing. Computing resource manager 141 may be any type of components in the computing device, such as a module in the operating system that manages computing resources. As shown in FIG. 1, computing resource manager 141 may include processor monitor 143 and networking monitor 145. Processor monitor 143 is configured to monitor one or more processors of the computing device. For example, processor monitor 143 may be configured to determine the usage level associated with the processing resources of the computing device. Processor monitor 143 may also be configured to identify idling processing resources that are not currently being used to perform any existing tasks and are available to perform other tasks, without significantly affecting the existing tasks. Networking monitor 145 is configured to monitor the networking resources of the computing device. For example, networking monitor 145 may be configured to determine the networking usage level of the computing device. In particular, networking monitor 145 may be configured to determine available networking bandwidth that is not being used by any applications. Computing resource manager 141 is configured to provide the computing resource information to flow computing module 105.

Flow computing module 105 is configured to enable users to receive information generated by applications 123 through a flow stream. The information in a flow stream is generated by an application based on a determination of what results are desired by prior user-initiated actions performed by the application. The desired results may be determined from information provided by usage analyzer 132 and may be based on a variety of factors, such as usage history, context, predetermined preference, the characteristics of the information, available command hierarchy, or the like.

Unlike conventional computer/user interactions which are command-driven, flow computing module 105 may be configured to automatically control applications 123 to perform the necessary actions to obtain the results, without requiring a user to issue the actual commands to execute the actions. Flow computing module 105 is configured to store the results in memory, which is shown in FIG. 1 as cached data 107.

Flow computing module 105 is also configured to provide the cached data 107 to the user as an interactive flow stream, which includes cached data 107. The flow stream may be configured as a data stream that can be directed by the user. Results that are desired are generated ahead of time and are provided in the flow stream, without requiring the user to perform actions with the applications to generate the results in real time. Flow computing module 105 may also be configured to allow the users to direct the flow stream of information by expressing a preference, such as accept, reject, modify, more like this, less like this, or the like. In this manner, the user may particularly specify the desired outcome to receive.

Flow computing module 105 is also configured to use idling computing resources to implement flow computing. Flow computing module 105 may interact with computing resource manager 141 to determine whether there are unused computing resources for performing tasks associated with flow computing. For example, flow computing module 105 may determine from computing resource manager 141 that the processor is not being used to its capacity and that the idling capacity can be used to perform additional tasks, without significantly affecting other tasks that are currently executing. Flow computing module 105 may be configured to enable applications 123 to use the idling capacity of the processor to create cached data 107. Flow computing module 105 may also determine from computing resource manager 141 networking bandwidth that is unused and available. Flow computing module 105 may be configured to allow applications 123 to use the unused networking bandwidth to retrieve data for flow computing and store the retrieved data in cached data 107.

In one example embodiment, flow computing module 105 is configured to use background cycles of the processor to index current and recent documents to retrieve related material in the background to reduce retrieval latency and enable fast pivoting and browsing of related resources. Flow computing module 105 may be configured to prevent the computing device from doing nothing and waiting for user input or direction. Instead, flow computing module 105 may be configured to constantly apply unused resources to retrieve and prioritize possible related materials based on the trajectory and context of the users historical and present activity focus. Relevant material can be cached for immediate access and purged if not needed. As material is selected additional metadata about the interaction with the selection is used to refine prediction algorithms for future trajectory and context. Flow computing module 105 may also be configured to provide a semantic map of the trajectory to the user for reference and interaction. An example semantic map will be discussed below in conjunction with FIG. 7. Briefly stated, the semantic map may be configured to enable the user to see the content of recent activity but to also see the trajectory of potential outcomes based on recent activity and make adjustments if needed to enhance the flow of predicted outcomes.

In another example embodiment, flow computing module 105 and usage analyzer 132 may be configured to implement Activity Profile Trajectory for flow computing. Activity Profile Trajectory is an ongoing assessment of what a user is trying to do given the user's personal profile, such as historical preferences and activities. In particular, Activity Profile Trajectory can establish the most likely tasks that the user is trying to accomplish based on the most recent the time and focus of activities. Flow computing module 105 may be configured to implement Activity Profile Trajectory to determine the results and data to generate, retrieve, and store as cache data 107.

An example of content Activity Profile Trajectory for web search shopping might be as follows: the search terms ("A") is entered into a search engine and is compared to all of the text of the retrieval results ("B") and the text of the links that are clicked on ("C") (weighed by dwell time or some other indicator of interest). The trajectory can be determined by comparing A/B with C/B. This method of comparison may be able to better predict what the user is looking for by evaluating the success (e.g. dwell time) of clicked links versus non clicked links. This information may also be used to predict the trajectory of behavior and to spawn other background searches for flow computing.

The components in example system 100 are shown in FIG. 1 for illustrative purpose. Actual implementation may include more, less or different components that provide similar functionalities as discussed above. For example, although flow computing module 105 is shown as an independent component in FIG. 1, another implementation may include a flow computing module that is incorporated into an application and provide the substantially the same flow computing functionalities as those of flow computing module 105. Similarly, usage analyzer 132 may be incorporated into other components, such as flow computing module 105. Also, the components shown in FIG. 1 are typically implemented in one computing device. However, the components may also be implemented in more than one computing devices that are in communication with each other.

Figure 2:
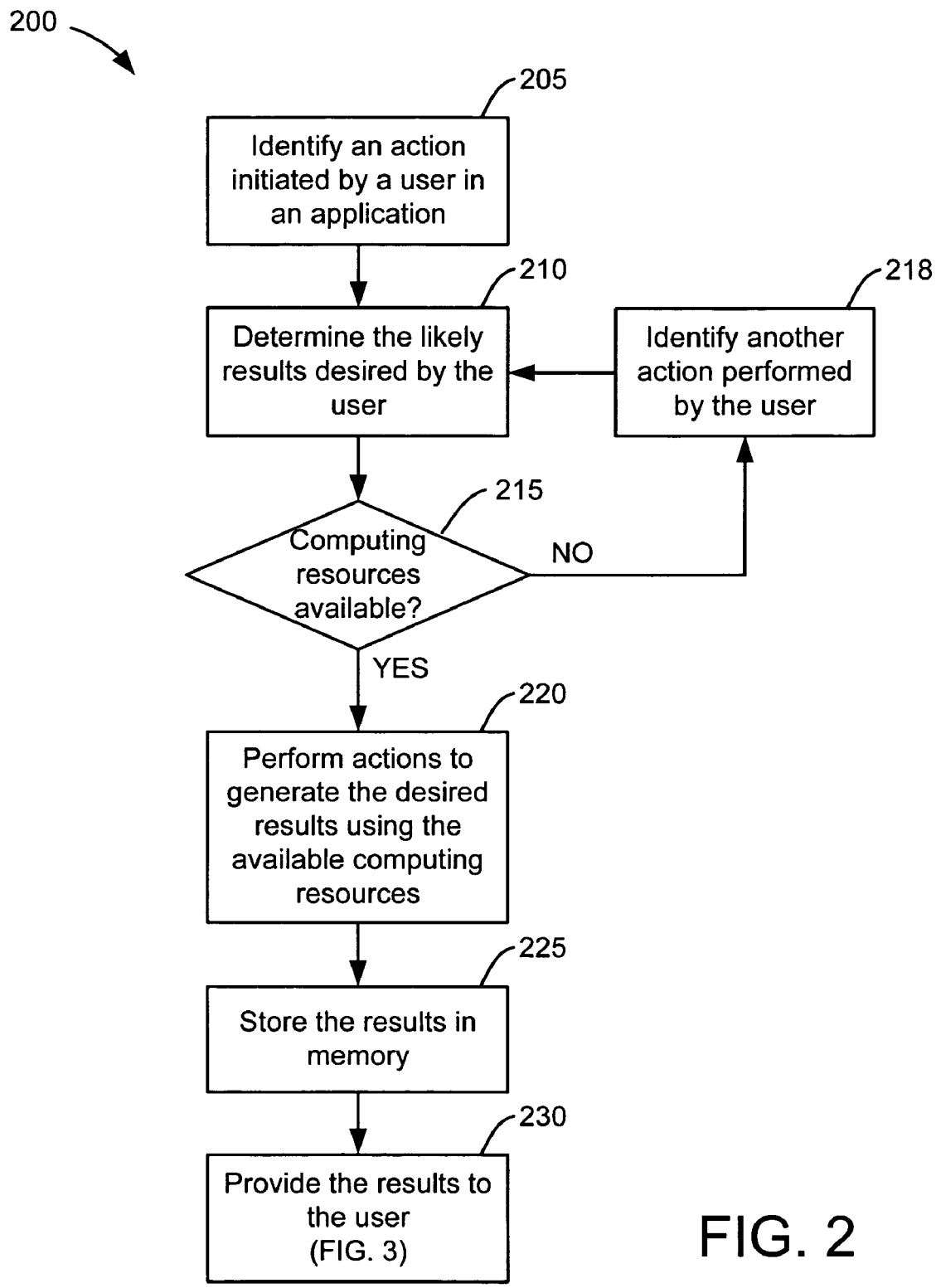
FIG. 2 shows an example process for providing flow computing functionalities to a user.

FIG. 2 shows an example process 200 for providing flow computing functionalities to a user. Process 200 may be implemented on a computing device to provide results to the user using available computing resources, such as background cycles. For example, process 200 may be performed by a flow computing module associated with an application. At block 205, an action initiated by a user in the application is identified. The action may include any action perform with an application, such as a click on a link, entry of data, selection from a menu, a command, or the like. At block 210, the most likely results desired by the user are determined. The likely results may be determined based on a prediction algorithm, such as a usage trajectory analysis. The algorithm may take any type of usage information into account, such as user preferences, analysis of historical personal behavior, tracking of the user context of current activity trajectories, Bayesian analysis or the like. At decision block 215, a determination is made whether computing resources are available to perform flow computing. Available computing resources may be quantified in a variety of manner and may include idling processor cycle, unused network bandwidth, or the like. If the computing resources are not available, process 200 moves to block 218 where another action performed by the user is identified. The process then goes back to block 210.

Returning to decision block 215, if the computing resources are available, process 200 moves to block 220 where actions to generate the desired results using the available computing resources are performed by the application. The flow computing module may instruct the application to generate or retrieve the results determined to be desirable by the user based on a prediction algorithm, such as Activity Profile Trajectory. At block 225, the results are stored in memory. At block 230, the results are provided to the user.

Figure 3:
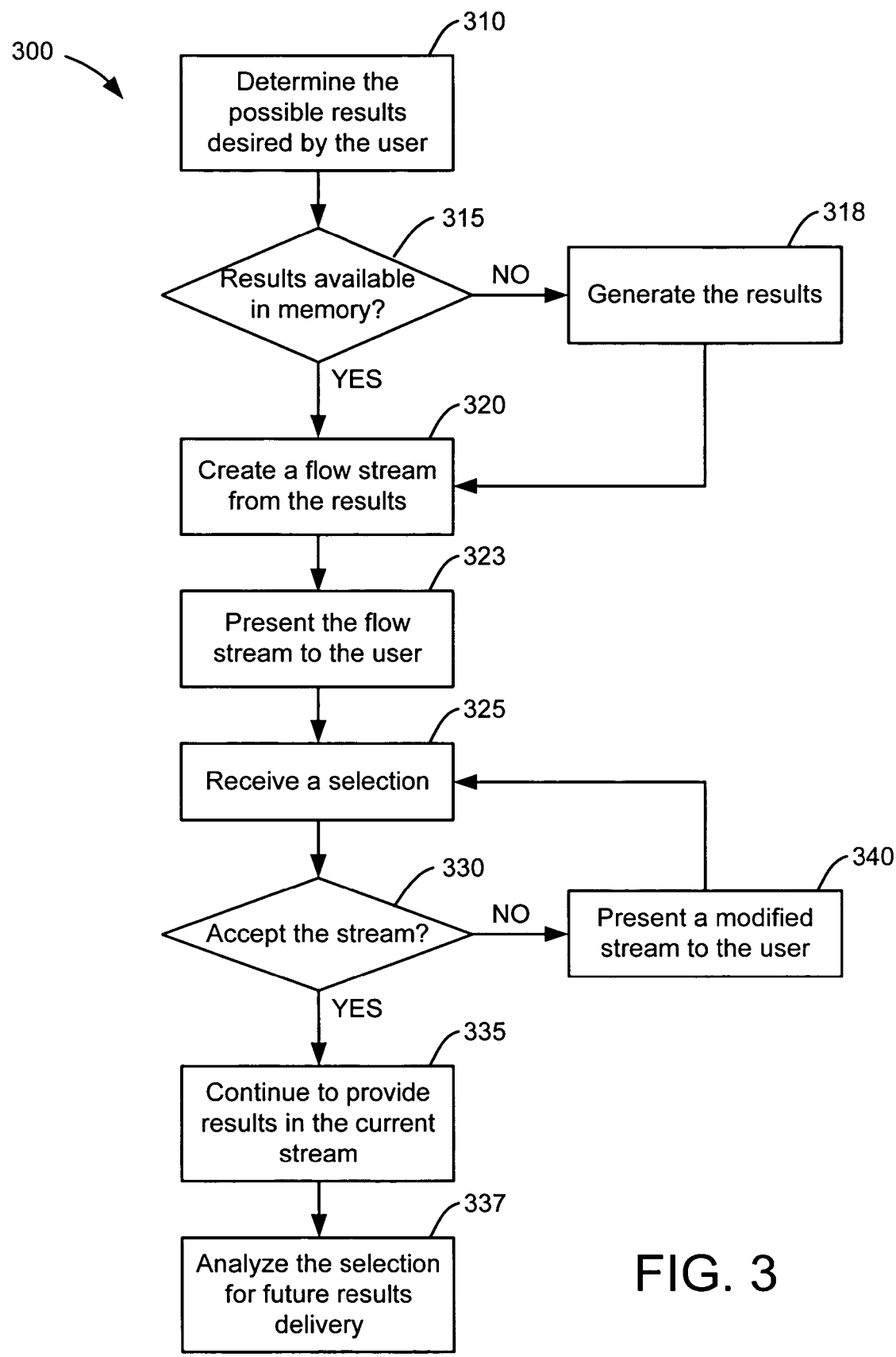
FIG. 3 shows an example process for providing results generated by flow computing to a user.

FIG. 3 shows an example process 300 for providing results generated by flow computing to a user. Process 300 may be implemented by a flow computing module to provide the results in conjunction with an application. At block 310, the possible results desired by the user are determined. A variety of data may be retrieved or generated by the flow computing module to provide results to the user for selection. At decision block 315, a determination is made whether results are available in memory. If so, process 300 goes to block 320. If the results are not available in memory, process 300 moves to block 318 where the results are generated. The process then continues at block 320.

At block 320, a flow stream is created from the results. At block 323, the flow stream is presented to the user. At block 325, a selection by the user is received. At decision block 330, a determination is made whether the stream is accepted by the user. If not, process 300 moves to block 340 where a modified stream is presented to the user. The stream may be modified based on a preference selected by the user. For example, the user may select items in the stream with "more like this" or "less like this". The selection enables the user to direct the flow stream to obtain the desired outcome. The process then returns to block 325.

Returning to decision block 330, if the stream is accepted by the user, process 300 moves to block 335 where the process continue to provide results in the current stream. At block 337, the selection is analyzed for future results delivery. For example, the selection may be used to refine a prediction algorithm in the flow computing module.

Figure 4:
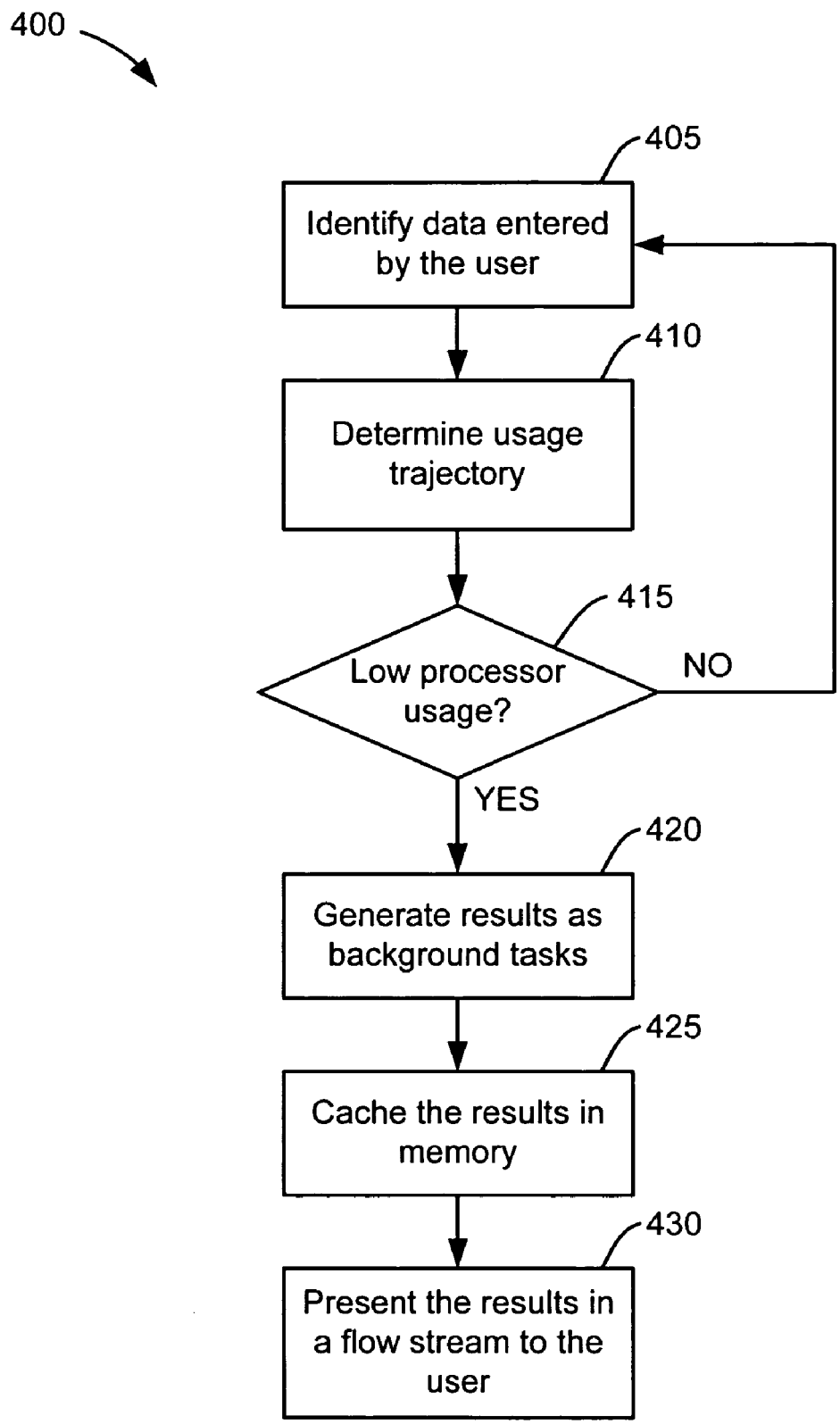
FIG. 4 shows an example process for an application in a computing device to perform flow computing for producing outcome desired by a user.

FIG. 4 shows an example process 400 for an application in a computing device to perform flow computing for producing outcome desired by a user. Process 400 may be performed by an information processing application configured with a flow computing module. At block 405, data entered by the user is identified. The data can be any type of information that is entered by the user for processing. For example, the data may include numbers entered into a spreadsheet, text entered into a word processor or presentation application, information entered into a database, media for processing by a viewing and editing tool, code for creating a webpage using a web authoring tool, or the like.

At block 410, usage trajectory associated with the user is determined. For example, the usage trajectory may be determined from a prediction algorithm, such as Activity Profile Trajectory. At decision block 415, a determination is made whether the utilization level of the processor in the computing device is low. For example, the low utilization level may be indicated by idling processing cycles. If the processor utilization is not low, process 400 returns to block 405. If the utilization level of the processor is low, process 400 moves to block 420 where results are generated as background tasks. The process may determine what results to generate based on the determined usage trajectory.

At block 425, the generated results are cached in memory. The generated results typically include results associated with multiple trajectories that are determined to be desirable by the user. At block 430, the results are presented to the user in a flow stream. The user may direct the flow stream by preference selection to obtain the desired outcome. An example implementation of process 400 for a spreadsheet application will be discussed below in conjunction with FIG. 6.

Figure 5:
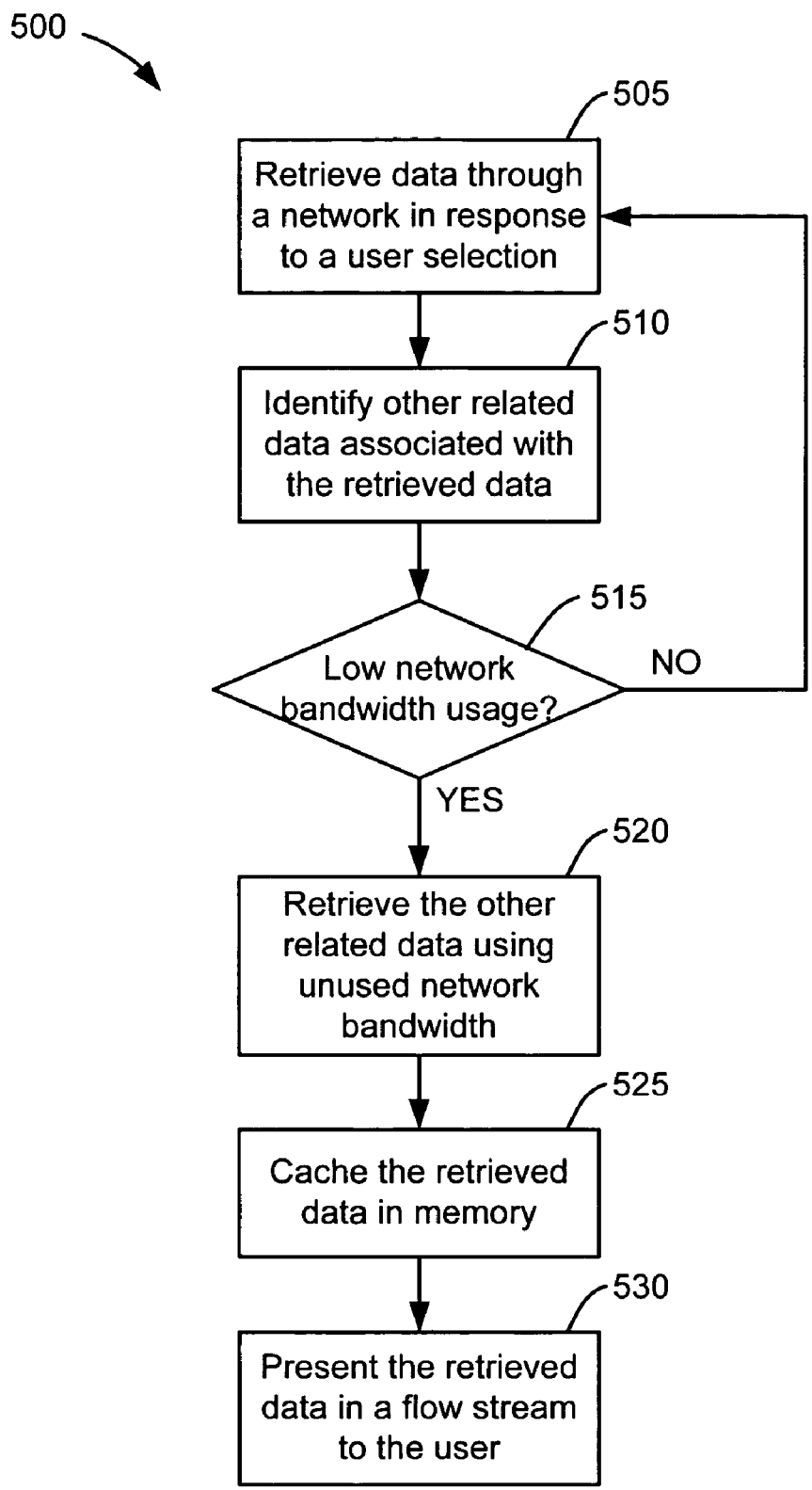
FIG. 5 shows an example process for an application in a computing device to perform flow computing for gathering information that may be desired by a user.

FIG. 5 shows an example process 500 for an application in a computing device to perform flow computing for gathering information that may be desired by a user. Process 500 may be implemented by a web browser to proactively provide web content to a user. Process 500 may also be used by other applications, such as media players, research tools, games, or the like. At block 505, data is retrieved through a network in response to a user selection. For example, the user may use a web browser to navigate to a particular location. The data may include web content associated a web page found at that location. At block 510, other related data associated with the retrieved data is identified. The other related data may include web content of web pages that are associated with the current web page. For example, these associated web pages may be indicated by links in the current web page.

At block 515, a determination is made whether the usage level of the network bandwidth is low. If so, process 500 returns to block 505. If the network bandwidth usage level is low, the other related data is retrieved using the unused network bandwidth. By using only idling network bandwidth, the retrieval is performed without adversely affecting other higher priority retrieval tasks. At block 525, the retrieved data are cached in memory. The user is typically interested in only a portion of the retrieved data. However, since the data is retrieved using idling network bandwidth and idling processing cycles, the amount of wasted resources is minimal.

At block 530, the retrieved data is presented to the user in a flow stream. In this manner, the user does not have to actually perform the actions to find, navigate and retrieve the desired information. Also, since the data in the flow stream is stored in memory, the flow stream can be presented to the user without being subjected to the delay associated with network data retrieval.

Figure 6:
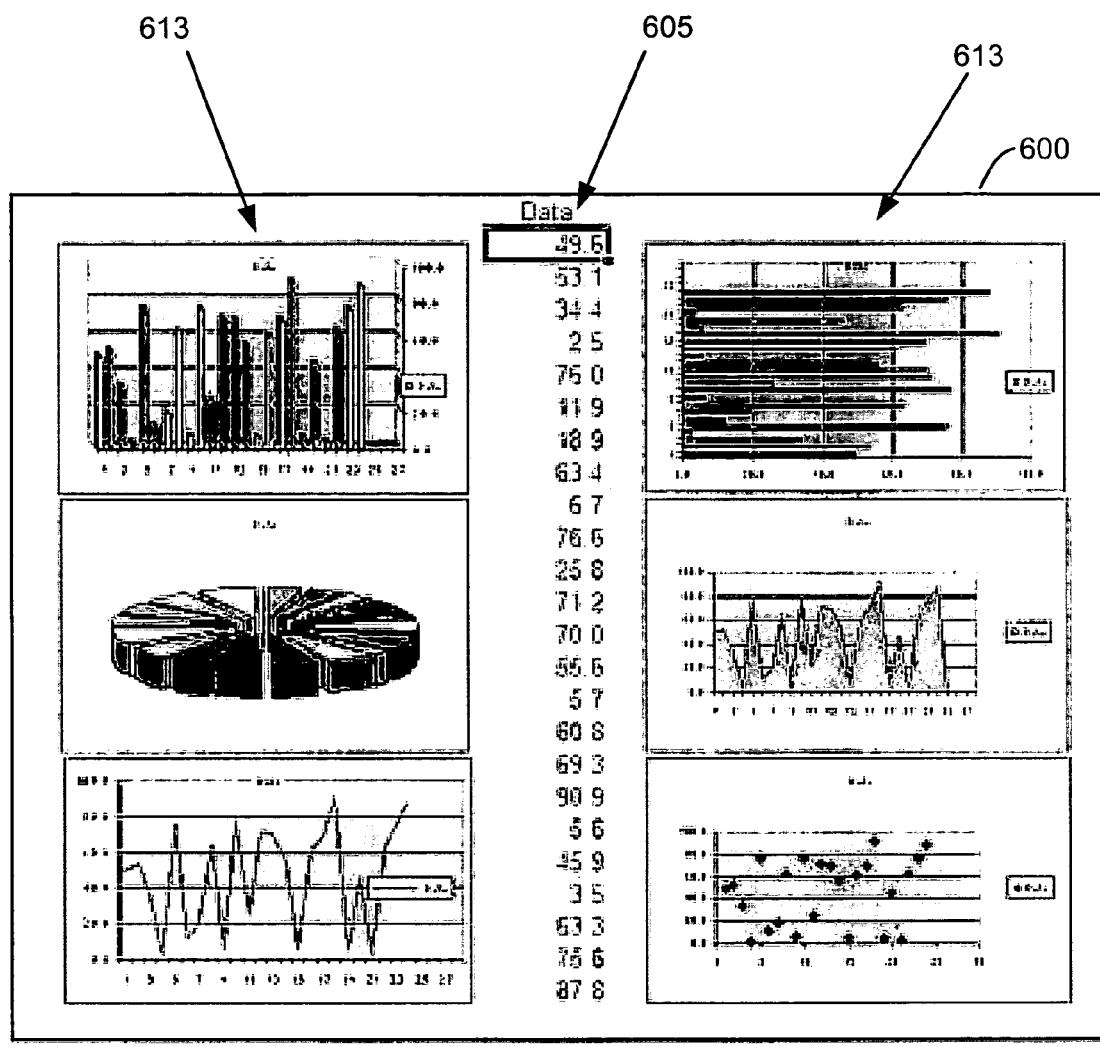
FIG. 6 shows an example screenshot of a portion of a user interface associated with a spreadsheet application.

FIG. 6 shows an example screenshot 600 of a portion of a user interface associated with a spreadsheet application. In this example, the spreadsheet application is configured with flow computing functionalities. As shown in FIG. 6, a user enters data 605 in the spreadsheet. The flow computing module associated with the spreadsheet application determines a usage trajectory associated with the entered data. In this example, the usage trajectory includes the creation of graphs. The flow computing module performs the actions to generate various graphs using background processing cycles of the computing device. The spreadsheet then presents a flow stream with the generated graphs 613 to the user for selection. The user may choose from options, such as "more like this" or "less like this", to direct the flow stream to achieve the desired outcome. For example, if the user selects a bar chart, various versions of bar chart may be presented to the user for further selection. The process may continue branching with the user continue to refine the outcome by choosing more specific versions of the graph until the desired graph is achieved. In this manner, the user can focus more on the desired outcome than on the specific command/menu structure of the spreadsheet application.

Figure 7:
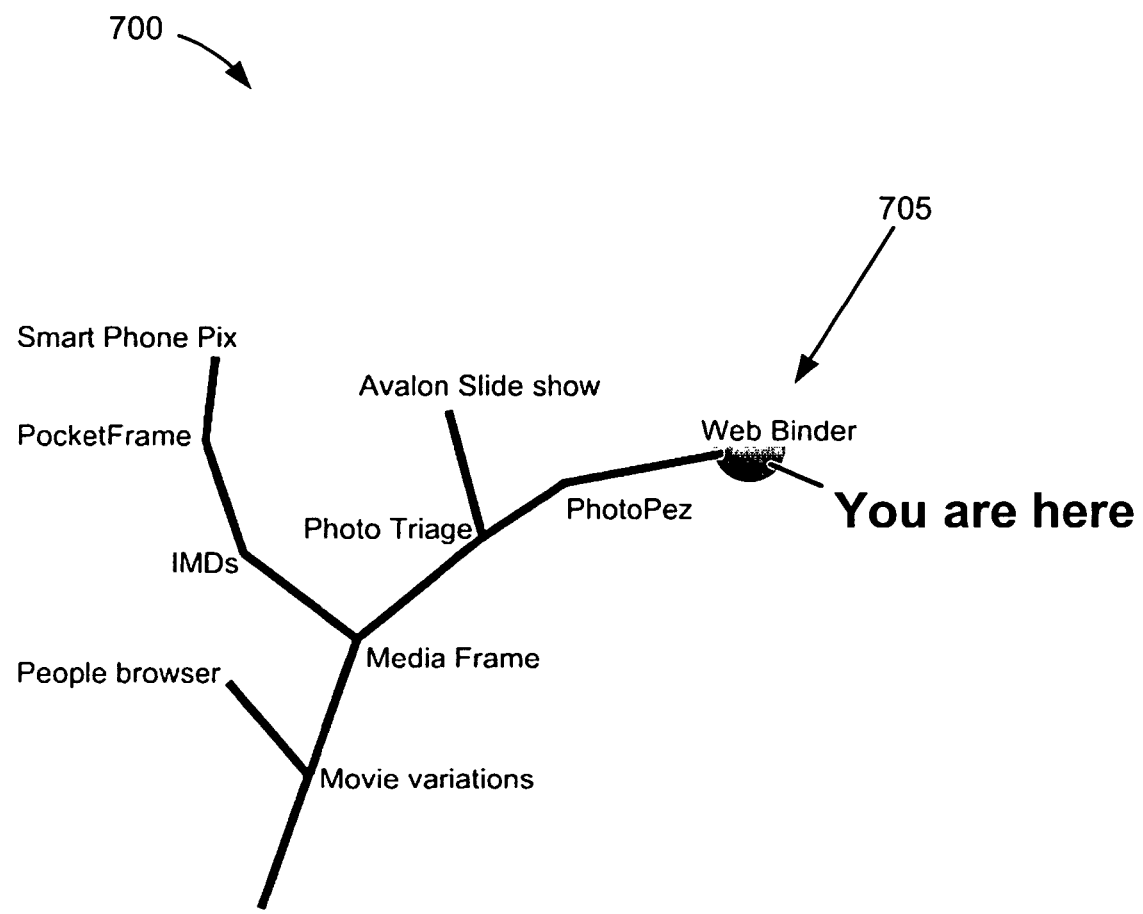
FIG. 7 shows an example semantic map for illustrating an ongoing activity trajectory.

FIG. 7 shows an example semantic map 700 for illustrating an ongoing activity trajectory. As shown in FIG. 7, semantic map 700 symbolically represents a usage trajectory associated with the activities of a user. The semantic map 700 may include an activity focus indicator 705 for showing the location at where the flow computing system is focusing. The semantic map 700 may be provided to the user to show for reference and for enabling the user to correct the indicated focus. The semantic map 700 may be presented in a user interface that may be activated when flow computing is active to provide context for its current state and potential directions.

The data abstraction provided by semantic map 700 may be useful for clustering modeling and refinement to determine probable context and focus. In particular, this information may be useful in assessing activity trajectory as well as serving as a reference for weighing personal profile information in evaluating new activities to determine their similarity to historical behavior.

The ability to summarize the semantic map by reducing it to lower levels of abstraction may be helpful to establish the structural relationships between activities. The determination of this structure may be derived from a variety of sources, such as semantic document analysis, summarization, explicit document annotation from key word associations, implicit association via co-location within a folder hierarchy, data interchange between other documents, or the like. The map can be made visible with an indication of "you are here", which provides feedback to the system's assessment of the focus of activities. The focus may easily be corrected by moving the focus point to another location that implicitly changes the activity association. The semantic map is analogous to a route roadmap derived from a trip by abstracting road information from signs and familiar landmarks passed, and extrapolating location, context and direction of possible destinations along the route.

Figure 8:
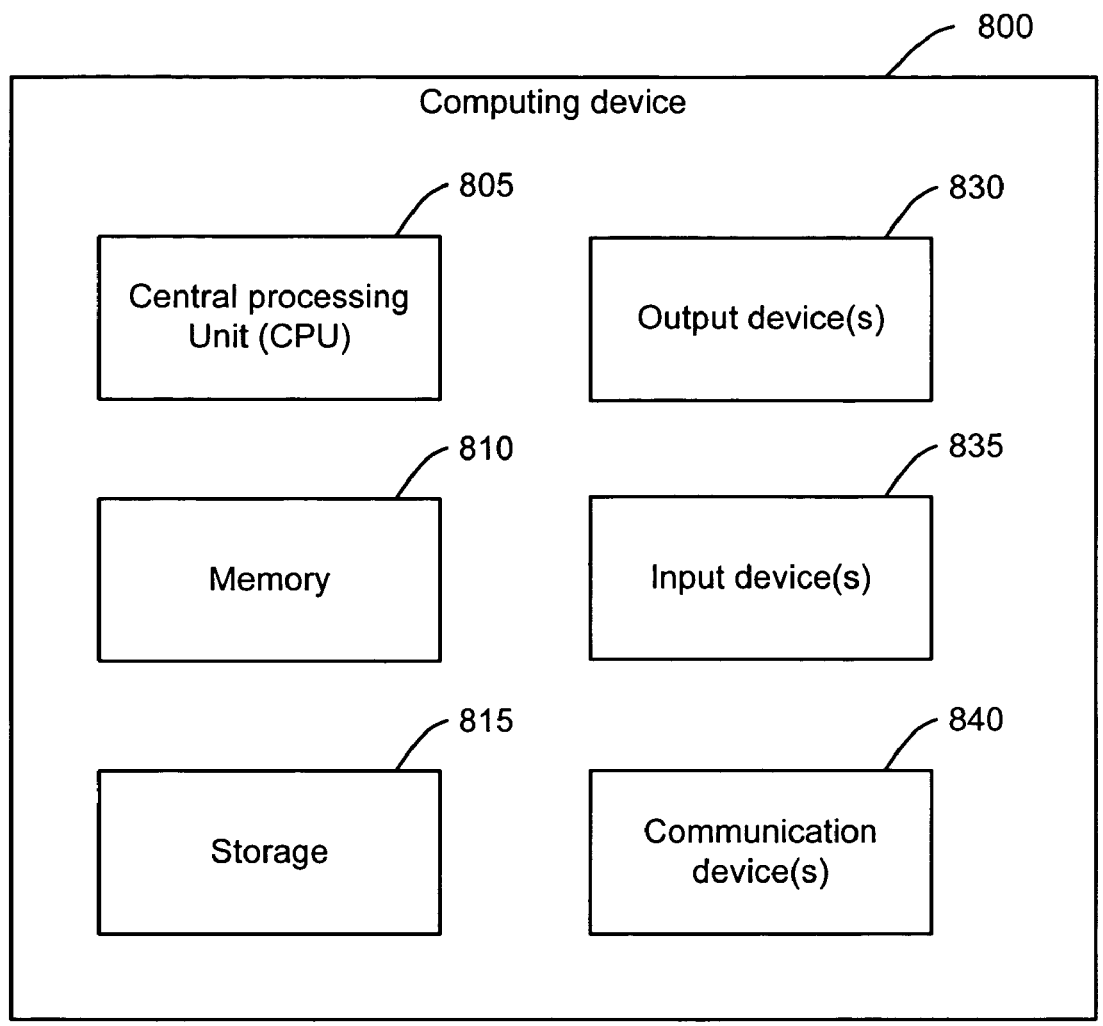
FIG. 8 shows an exemplary computer device for implementing the described systems and methods.

FIG. 8 shows an exemplary computer device 800 for implementing the described systems and methods. In its most basic configuration, computing device 800 typically includes at least one central processing unit (CPU) 805 and memory 810.

Depending on the exact configuration and type of computing device, memory 810 may be volatile (such as RAM), non-volatile (such as ROM, flash memory, etc.) or some combination of the two. Additionally, computing device 800 may also have additional features/functionality. For example, computing device 800 may include multiple CPU's. The described methods may be executed in any manner by any processing unit in computing device 800. For example, the described process may be executed by both multiple CPU's in parallel.

Computing device 800 may also include additional storage (removable and/or non-removable) including, but not limited to, magnetic or optical disks or tape. Such additional storage is illustrated in FIG. 8 by storage 815. Computer storage media includes volatile and nonvolatile, removable and non-removable media implemented in any method or technology for storage of information such as computer readable instructions, data structures, program modules or other data. Memory 810 and storage 815 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 800. Any such computer storage media may be part of computing device 800.

Computing device 800 may also contain communications device(s) 840 that allow the device to communicate with other devices. Communications device(s) 840 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 800 may also have input device(s) 835 such as keyboard, mouse, pen, voice input device, touch input device, etc. Output device(s) 830 such as a display, speakers, printer, etc. may also be included. All these devices are well know in the art and need not be discussed at length.

While the preferred embodiment of the invention has been illustrated and described, it will be appreciated that various changes can be made therein without departing from the spirit and scope of the invention.

The invention claimed is:

1. One or more device-readable storage media encoded with device-executable instructions including steps comprising:

identifying a user-initiated action performed in an application executing in a computing device;

determining at least two possible results that the user-initiated action is intended to achieve;

identifying idle computing resources in the computing device that are available;

automatically performing other actions in the application to produce at least one of the possible results using the idling computing resources;

determining a usage trajectory based, at least in part, on the user-initiated action and an output of a usage analyzer which is configured to analyze user usage pattern for an application;

enabling a selection to direct the interactive data stream;

in response to receiving the selection, including other possible results in the data stream in accordance with the selection;

storing the possible results in a memory of the computing device;

providing the at least one of the possible results by retrieving from the memory, wherein the possible results are determined based on a prediction algorithm, wherein the prediction algorithm accounts for at least one of a user preference, a user profile, historical personal behavior, or context of a current activity trajectory, wherein the usage trajectory is an Activity Profile Trajectory, wherein the Activity Profile Trajectory determines the most likely tasks that a user is trying to accomplish based on the user's historical preferences and activities;

determining possible results based on the usage trajectory; and providing at least one of the possible results in an interactive data stream.

2. The one or more device-readable storage media as recited in claim 1, wherein the selection includes at least one of accept, reject, modify, more like this or less like this.

3. The one or more device-readable storage media as recited in claim 1, wherein the user-initiated action includes at least one of a click on a link, entry of data, a selection from a menu, or a command.

4. The one or more device-readable storage media as recited in claim 1, further comprising instructions for causing a computer to perform:

presenting the trajectory as a semantic map; and indicating a current activity focus on the semantic map.

5. The one or more device-readable storage media as recited in claim 4, further comprising instructions for causing a computer to perform enabling a user to move the current activity focus on the semantic map.

6. A computing device configured with a computer-readable storage medium encoded with computer-executable components comprising:

an application configured to perform actions;

an analyzer configured to determine a usage trajectory associated with the application based, at least in part, on the actions performed by the application;

a computing resource manager configured to monitor computing resources of the computing device, the computing resource manager further configured to identify idling computing resources, wherein the computing resource manager includes a processing monitor being configured to identity idling processing resources that are not being used to perform existing tasks and a networking monitor being configured to determine available bandwidth that is not being used by any applications;

a flow computing module configured to determine at least two possible results intended by the performed actions based, at least in part, on the usage trajectory determined by the analyzer, the flow computing module also configured to instruct the application to generate the possible results using the idling computing resources and to store the generated results in a memory of the computing device, the flow computing module further configured to provide at least one of the generated results in an interactive data stream, wherein the generated results are generated ahead of time and a provided in the interactive data stream without requiring a user to perform actions with the applications to generate the results in real time; and wherein the flow computing module is also configured to represent the usage trajectory in a semantic map and to include an indicator on the semantic map to represent an activity focus and wherein the flow computing module is further configured to provide the semantic map to a user and to enable the user to modify the activity focus by moving the indicator along the semantic map.

7. The computing device as recited in claim 6, wherein the flow computing module is further configured to provide selectable options for directing the data stream and, upon receiving a selection of the options, to include other generated results in the data stream based, at least in part, on the selection.

8. The computing device as recited in claim 6, the analyzer is further configured to determine the usage trajectory from evaluating at least one of options that have been selected by a user, the context of the tasks performed by the application, or a structure or a usage frequency of commands associated with the application.

9. The computing device as recited in claim 6, wherein the application includes at least one of an information processing application, a word processor, a presentation tool, a spreadsheet, a database, a media viewing and editing tool, a web authoring tool, a media content software, a viewing and editing tool for video, graphics, audio or images, a web browser, or a media player.

10. A system comprising:

a usage analyzer for anticipating at least two possible results that a user may desire from an application;

a flow computing module for using background computing cycles and a computing resource manager includes a processing monitor being configured to identity idling processing resources that are not being used to perform existing tasks and a networking monitor being configured to determine available bandwidth that is not being used by any applications to automatically generate at least one of the possible results; and wherein the flow computing module is configured to determine a usage trajectory based, at least in part, on the user-initiated action and a usage analyzer which is configured to analyze user usage pattern for an application and to enable the user to choose from the possible results to achieve a desired outcome, without requiring the user to initiating commands in the application to generate the results, to receive data associated with an application for automatically generating graphs from the received data using the background computing cycles of a processor, wherein the graphs are determined to be desirable by the user and wherein the graphs are generated without any command issued by the user; and to provide the graphs to the user for selection.

11. The system as recited in claim 10, further comprising:

a flow computing module configured to receive an instruction from the user to browser to a first web location;

automatically download data from other web locations associated with the first web location using the background computing cycles, wherein the background computing cycles include idling processing cycles and unused networking bandwidth;

cache the downloaded data; and provide the downloaded data to the user in an interactive data stream.

* * * * *